United States Patent
Choe et al.

(10) Patent No.: US 8,063,913 B2
(45) Date of Patent: Nov. 22, 2011

(54) METHOD AND APPARATUS FOR DISPLAYING IMAGE SIGNAL

(75) Inventors: Won-hee Choe, Gyeongiu-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 967 days.

(21) Appl. No.: 11/491,242

(22) Filed: Jul. 24, 2006

(65) Prior Publication Data
US 2007/0035557 A1 Feb. 15, 2007

(30) Foreign Application Priority Data
Aug. 12, 2005 (KR) .................. 10-2005-0074418

(51) Int. Cl.
*G09G 5/00* (2006.01)
(52) U.S. Cl. .................. 345/611; 345/613; 345/616
(58) Field of Classification Search .................. 345/611, 345/613, 616
See application file for complete search history.

(56) References Cited

U.S. PATENT DOCUMENTS

| | | | |
|---|---|---|---|
| 5,341,153 A | 8/1994 | Benzschawel et al. | |
| 5,418,574 A * | 5/1995 | Miyabata et al. | 348/625 |
| 5,430,497 A * | 7/1995 | Strolle et al. | 348/607 |
| 5,596,655 A * | 1/1997 | Lopez | 382/173 |
| 5,715,335 A * | 2/1998 | De Haan et al. | 382/265 |
| 6,134,355 A * | 10/2000 | Yamada et al. | 382/272 |
| 6,243,070 B1 * | 6/2001 | Hill et al. | 345/589 |
| 6,384,839 B1 | 5/2002 | Paul | |
| 6,396,505 B1 * | 5/2002 | Lui et al. | 345/613 |
| 6,532,022 B1 * | 3/2003 | Ahmad | 345/629 |
| 6,748,116 B1 * | 6/2004 | Yue | 382/238 |
| 6,756,992 B2 | 6/2004 | Toji et al. | |
| 6,812,932 B2 * | 11/2004 | Kasahara et al. | 345/613 |
| 6,823,088 B2 | 11/2004 | Kaneko et al. | |
| 6,865,301 B1 * | 3/2005 | Harris | 382/269 |
| 7,034,791 B1 * | 4/2006 | Odom | 345/98 |
| 2002/0097439 A1 * | 7/2002 | Braica | 358/3.26 |
| 2002/0110274 A1 * | 8/2002 | Yamamoto | 382/154 |
| 2002/0131643 A1 * | 9/2002 | Fels et al. | 382/224 |
| 2003/0095135 A1 | 5/2003 | Kaasila et al. | |

(Continued)

FOREIGN PATENT DOCUMENTS

JP 2000-115540 4/2000
(Continued)

OTHER PUBLICATIONS

Korean Office Action (Notice of Examination Report) dated and issued Mar. 21, 2007 in priority Korean Patent Application No. 10-2005-0074418.
U.S. Appl. No. 11/492,117, filed Jul. 25, 2006, Won-hee Choe, et al.

*Primary Examiner* — Xiao M. Wu
*Assistant Examiner* — David T Welch
(74) *Attorney, Agent, or Firm* — Staas & Halsey LLP

(57) ABSTRACT

A method and apparatus for reducing color error bands occurring due to the abrupt difference in brightness between sub-pixels. In the method of displaying an image signal of an apparatus for displaying the image signal, the apparatus includes a plurality of pixels each having at least two sub-pixels, and the method includes detecting pixels that belong to an edge of an input image, changing pixel values of the sub-pixels constituting the pixels belonging to the edge, and driving a display in accordance with the new pixel value.

22 Claims, 7 Drawing Sheets

(a) Falling Edge (b) Rising Edge

U.S. PATENT DOCUMENTS

| | | | |
|---|---|---|---|
| 2003/0099044 A1* | 5/2003 | Fujii | 359/698 |
| 2003/0107582 A1* | 6/2003 | Maeda et al. | 345/611 |
| 2003/0146920 A1* | 8/2003 | Tezuka et al. | 345/629 |
| 2003/0169442 A1* | 9/2003 | Yokochi | 358/1.9 |
| 2003/0214513 A1 | 11/2003 | Brown et al. | |
| 2004/0080479 A1 | 4/2004 | Credelle | |
| 2004/0109611 A1* | 6/2004 | Perlmutter et al. | 382/254 |
| 2005/0011957 A1* | 1/2005 | Attia et al. | 235/462.46 |
| 2005/0025357 A1* | 2/2005 | Landwehr et al. | 382/170 |
| 2005/0135700 A1* | 6/2005 | Anderson | 382/261 |
| 2005/0243109 A1* | 11/2005 | Stevens | 345/694 |
| 2008/0204393 A1* | 8/2008 | Ben-David | 345/98 |

FOREIGN PATENT DOCUMENTS

| | | |
|---|---|---|
| JP | 2002-354277 | 6/2002 |
| KR | 10-2000-0076570 | 12/2000 |
| KR | 2001-64125 | 7/2001 |

\* cited by examiner (a) Falling Edge  (b) Rising Edge (a) Falling Edge  (b) Rising Edge (a) Falling Edge     (b) Rising Edge

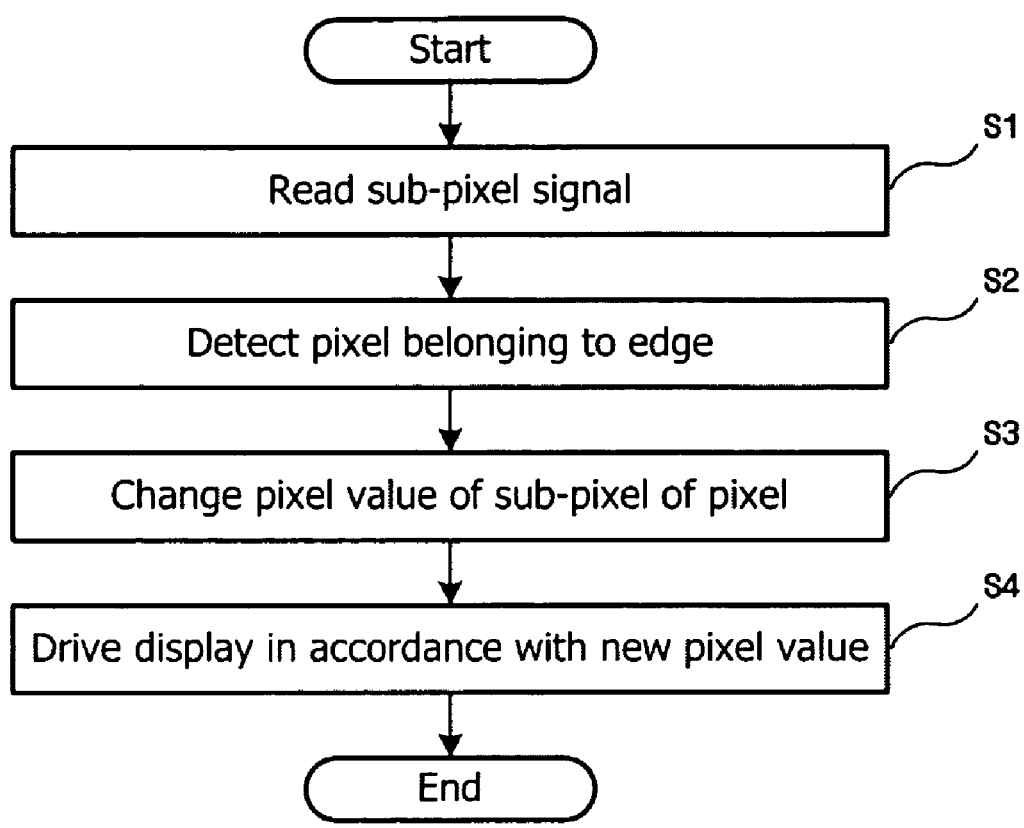

METHOD AND APPARATUS FOR DISPLAYING IMAGE SIGNAL

CROSS-REFERENCE TO RELATED APPLICATIONS

This application is based on and claims priority from Korean Patent Application No. 10-2005-0074418, filed on Aug. 12, 2006, the disclosure of which is incorporated herein in its entirety by reference.

BACKGROUND OF THE INVENTION

1. Field of the Invention

The present invention relates to a method and apparatus for displaying an image signal, and, more particularly, to a method and apparatus for reducing color error bands occurring due to the abrupt difference in brightness between sub-pixels in an apparatus for displaying an image signal, such as a liquid crystal display (LCD), a plasma display panel (PDP), a light-emitting diode (LED), or an organic light emitting diode (OLED).

2. Description of the Related Art

A color space is a model for representing color numerically in terms of three or more coordinates. Different image processing systems employ different color spaces for different reasons. At present, most apparatuses for displaying an image signal, such as a color CRT monitor, LCD monitor, or a PDP monitor, use the RGB color space.

The RGB color space uses the three primary colors red (R), green (G), and blue (B), which can be added to form other colors. Spectral components of these colors are added to one another to make other colors.

An RGB model includes a three-dimensional cube whose corners are red, green and blue, its origin is black, and the opposite end of the three-dimensional cube is white. For example, in a 24-bit color system having 8 bits per color, red is denoted by (255,0,0).

The RGB model makes design of a computer graphic system simple, but it is not ideal for every application. This is because of relations among R, G and B color components. Various image processing techniques such as histogram equalization depend on the brightness of an image. Accordingly, RGB images need to be frequently converted into brightness images. In order to convert images from RGB colors into a brightness level, Equation (1) is used (National Television Systems Committee (NTSC) standard).

$$Y=0.288R+0.587G+0.114B \quad (1)$$

Among R, G and B components, since the G component acts as a significant component in a brightness level, only the brightness corresponding to green is used as data for the brightness level. Consequently, the G component is generally positioned in the center of a pixel in a display of a sub-pixel structure; sub-pixels are arranged in the order of R, G and B, or B, G and R.

The image display technique based on the aforementioned RGB sub-pixels may be divided into a technical field for enhancing resolution and a technical field for correcting a pixel error. Examples of enhancing resolution include a technique for generating image data using a controller in pixel and sub-pixel driving modes as discussed in U.S. Pat. No. 6,823,088 and a technique based in a re-sampling filter as discussed in U.S. Patent Application No. 2004/0080479.

Examples of correcting a pixel error include a technique for sub-sampling an image after magnifying the image three times in a state where a database for font is maintained as discussed in U.S. Pat. No. 6,756,992, and a technique for removing jagging of text as discussed in U.S. Patent Application No. 2003/0214513.

The present invention belongs to the aforementioned technical field of correcting the pixel error but has aspects and solutions different from those of the aforementioned technical fields.

FIG. 1 illustrates a character "A" displayed by an RGB sub-pixel type display. As shown in FIG. 1, one pixel has a structure in which a plurality of RGB sub-pixels 11 is alternately arranged in a space. If each of the RGB sub-pixels 11 has a pixel value of a certain size, all the colors can be displayed by combination of the pixel values of the sub-pixels. A black pixel 12 constituting a character row can be displayed as RGB sub-pixels having values of 0, 0 and 0. However, since the RGB sub-pixels respectively occupy different spaces, a problem occurs in that exact sub-pixel blending may not be provided. Particularly, this problem is most noticeable in the case of a large-sized pixel or at the boundary between pixels. For example, blue may be displayed at the left side of a character row by a blue sub-pixel positioned at a left boundary of the black pixel 12.

FIG. 2 illustrates color error bands. As shown in FIG. 2, color error bands 21 and 22 may occur where a brightness value is abruptly varied by perceptive characteristics, such as a boundary between objects. A distorted result different from the strength of an actual image signal is caused by the color error bands 21 and 22. These color error bands are most noticeable when the pixel is large.

SUMMARY OF THE INVENTION

Accordingly, the present invention has been made to solve the above-mentioned problems occurring in the prior art, and an aspect of the present invention is to provide a method and apparatus for reducing both color error bands occurring due to the increased pixel size in a sub-pixel-based display and the abrupt difference in brightness between sub-pixels.

Additional advantages, aspects and features of the invention will be set forth in part in the description which follows and in part will become apparent to those having ordinary skill in the art upon examination of the following or may be learned from practice of the invention.

In order to accomplish these objects, there is provided a method of displaying an image signal in a display apparatus, in which the display apparatus has a plurality of pixels each having at least two sub-pixels. The method includes (a) detecting pixels that belong to an edge of an input image, (b) changing values of the sub-pixels constituting the pixels belonging to the edge, and (c) driving a display in accordance with the new pixel values.

In another aspect of the present invention, there is provided an apparatus for displaying an image signal, in which the apparatus has a plurality of pixels each having at least two sub-pixels. The apparatus further includes an edge detector detecting pixels that belong to an edge of an input image, a signal corrector changing pixel values of the sub-pixels constituting the edge pixels, and a display driver driving a display in accordance with the new pixel values.

BRIEF DESCRIPTION OF THE DRAWINGS

The above and other aspects, features and advantages of the present invention will be more apparent from the following detailed description taken in conjunction with the accompanying drawings, in which:

FIG. 13 is a flowchart illustrating a method of displaying an image signal according to an embodiment of the present invention.

DETAILED DESCRIPTION OF THE PREFERRED EMBODIMENTS

Figure 1:
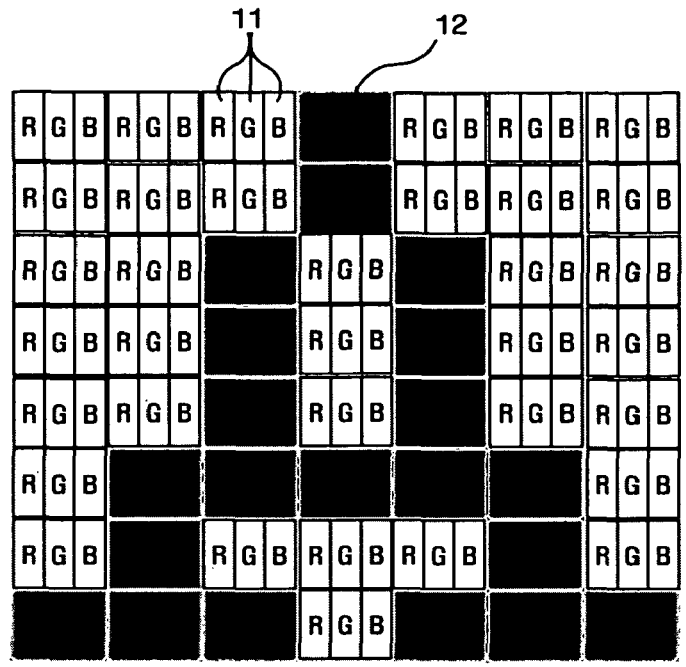
FIG. 1 is a view illustrating a character "A" displayed by an RGB sub-pixel type display.
Figure 2:
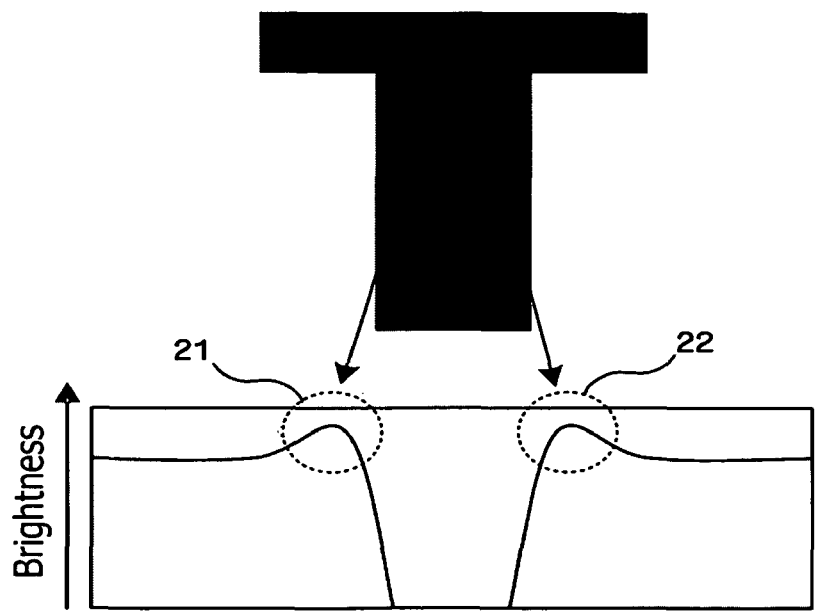
FIG. 2 is a view illustrating color error bands.

Hereinafter, embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention is intended to reduce or remove color error bands occurring at the boundary (edge) of an image, and can be applied to an apparatus for displaying an image signal, in which sub-pixels are arranged in the order of R, G and B, or B, G and R. Such an arrangement is oriented in left and right directions. However, such an arrangement is not limited to left and right directions.

Figure 3:
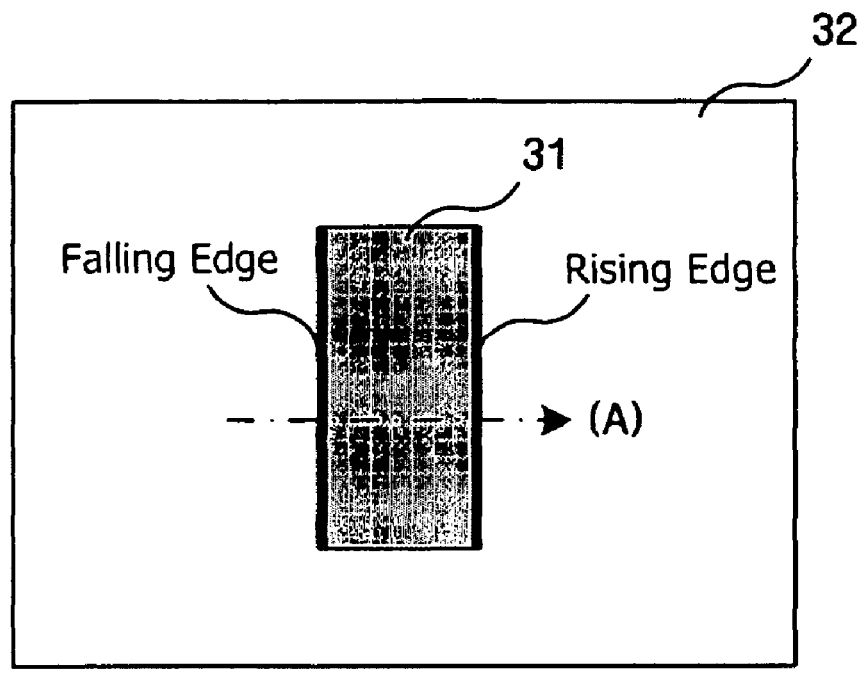
FIG. 3 is a view illustrating types of left and right edges if an object is darker than its background.
Figure 4:
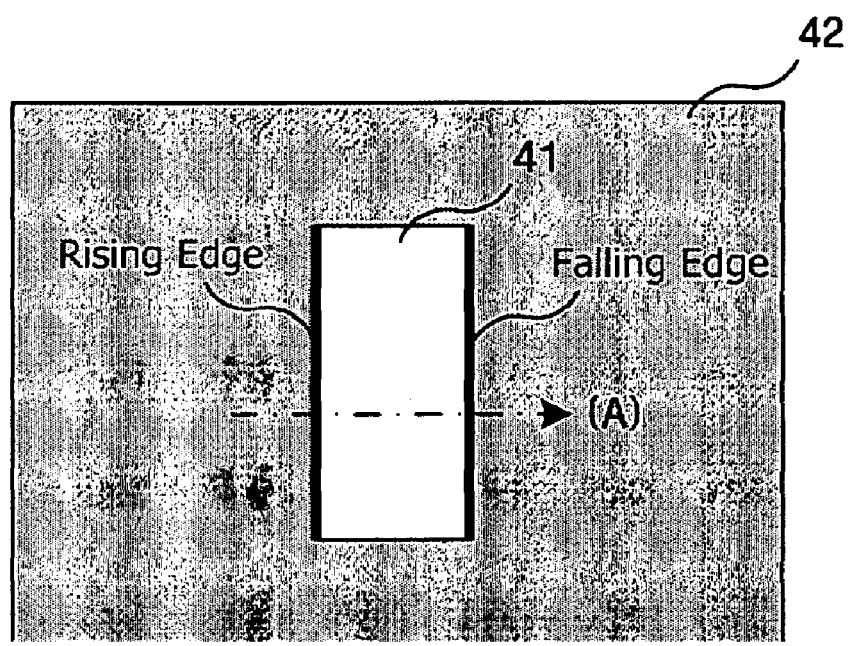
FIG. 4 is a view illustrating types of left and right edges if an object is brighter than its background.

FIGS. 3 and 4 illustrate types of left and right edges. FIG. 3 illustrates types of left and right edges if an object 31 is darker than its background 32 while FIG. 4 illustrates types of left and right edges if an object 41 is brighter than its background 42.

Referring to FIG. 3, it can be seen that the brightness of a pixel falls at the left edge of the object 31 while the brightness of the pixel rises at the right edge of the object 31 along a direction A (from the left to the right). Accordingly, the left edge is a falling edge while the right edge is a rising edge.

Referring to FIG. 4, it should be noted that the brightness of the pixel rises at the left edge of the object 41 while the brightness of the pixel is falls at the right edge of the object 41 along a direction A. Accordingly, the left edge is a rising edge while the right edge is a falling edge.

In the apparatus for displaying an image signal, in which sub-pixels are arranged in the order of B, G and R, R is located at the falling edge, and B is located at the rising edge.

Figure 5:
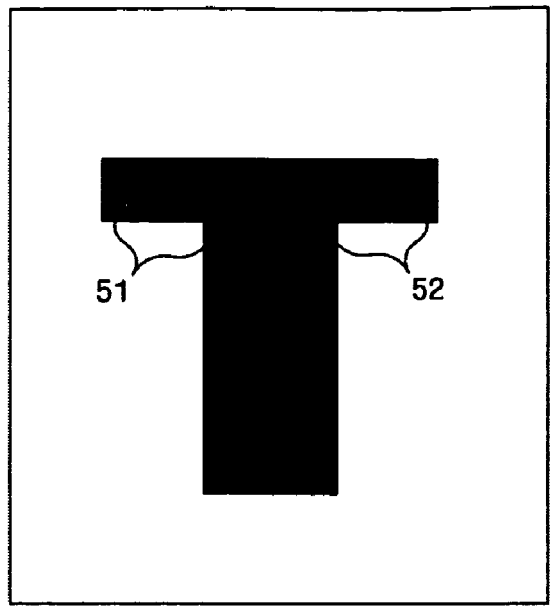
FIG. 5 is a view illustrating color error bands if an object is darker than its background as shown in FIG. 3.

Accordingly, if the object is darker than the background as shown in FIG. 3, the color error bands occurring in the screen may be displayed as shown in FIG. 5. In other words, the red color error band 51 mainly occurs near the left edge of the object and the blue color error band 52 mainly occurs near the right edge of the object.

Figure 6:
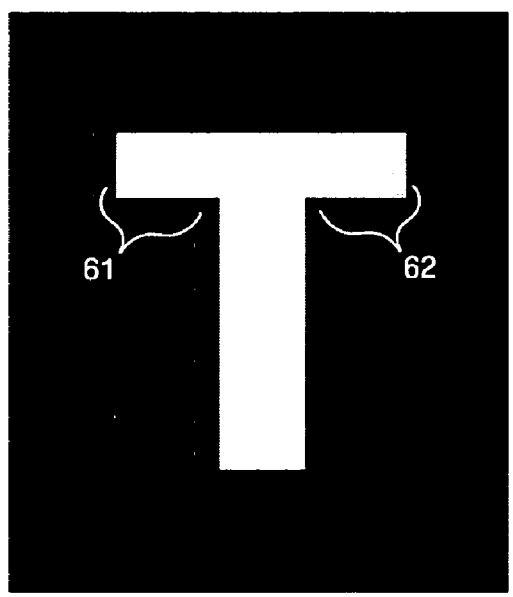
FIG. 6 is a view illustrating color error bands if an object is brighter than its background as shown in FIG. 4.

Meanwhile, if the object is brighter than the background as shown in FIG. 4, the color error bands occurring in the screen may be displayed as shown in FIG. 6. In other words, the blue color error band 61 mainly occurs near the left edge of the object and the red color error band 62 mainly occurs near the right edge of the object.

Figure 7:
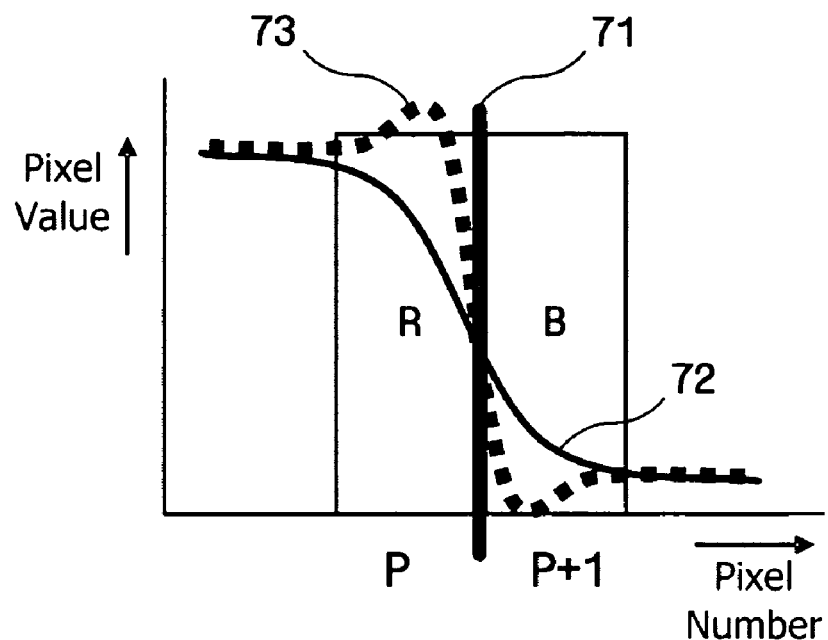
FIG. 7 is a graph illustrating a comparison result of an input pixel value and an output pixel value near a falling edge.

FIG. 7 is a graph illustrating a comparison result of an input pixel value and an output pixel value near the falling edge. Referring to FIG. 7, a signal 72 showing an input pixel value around the boundary 71 of pixels falls at the falling edge as the pixel number increases. The pixel number increases from left to right.

The signal actually displayed by the above input signal 72, i.e., an output pixel value 73 has a pattern different from that of the input signal 72. It can be seen in FIG. 7 that the R component is displayed higher than the actual input signal 72, and the B component is displayed lower than the actual input signal 72 at the falling edge. This distortion may cause color error bands.

Figure 8:
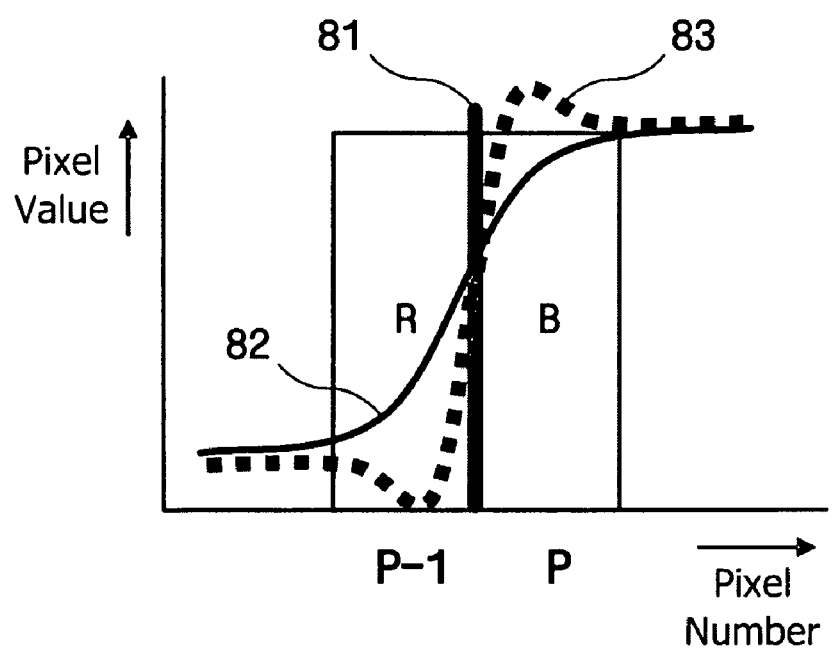
FIG. 8 is a graph illustrating a comparison result of an input pixel value and an output pixel value near a rising edge.

FIG. 8 is a graph illustrating a comparison result of an input pixel value and an output pixel value near the rising edge. Referring to FIG. 8, a signal 82 showing an input pixel value around the boundary 81 of pixels is rising at the rising edge as the pixel number increases. It can be seen in FIG. 8 that the B component of an output pixel value 83 is displayed higher than the actual input signal 82, and its R component is displayed lower than the actual input signal 82 at the rising edge.

Accordingly, the present invention is intended to suggest a method of reducing distortion occurring at the falling edge or the rising edge as shown in FIG. 7 or 8. Examples of such a method include a first method of changing a distorted sub-pixel component only to reduce distortion, a second method of changing sub-pixel components adjacent to a distorted sub-pixel component while maintaining the distorted sub-pixel component, and a combined method of the first and second methods. Hereinafter, several embodiments according to these methods will be described.

First Embodiment

Figure 9:
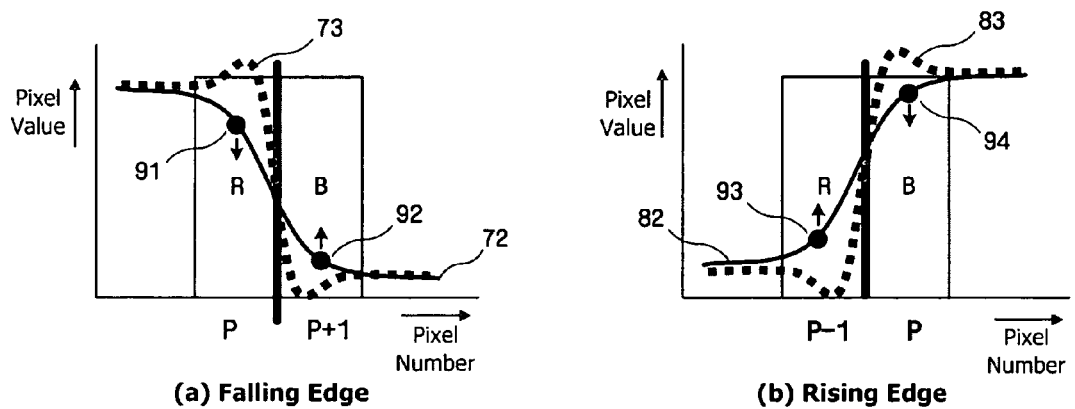
FIG. 9 is a view illustrating a first embodiment of the present invention.

In the first embodiment, a method of changing a distorted sub-pixel component only is suggested as shown in FIG. 9. At the falling edge shown in (a) of FIG. 9, R component 91 of an input signal 72 is corrected to be decreased by a predetermined value so that an increased output pixel value can be corrected, while B component 92 of the input signal 72 is corrected to be increased by a predetermined value so that a decreased output pixel value can be corrected.

The decreased R component (R') can be expressed as Equation (2) while the increased B component (B') can be expressed as Equation (3). It is noted from Equation (2) that the correction range increases as the difference between current sub-pixels R(p) and B(p) and next sub-pixels R(p+1) and B(p+1) increases.

$$R' = \alpha \times \{R(p) - R(p+1)\} + R(p+1) \quad (2)$$

$$B' = \beta \times \{B(p) - B(p+1)\} + B(p+1) \quad (3)$$

In Equation (2) and Equation (3), $\alpha$ and $\beta$ are factors for determining the correction range and have a constant value between 0 and 1. The sum of α and β may be equal to 1 when considering balance according to correction. For example, α may be defined as ½ while β may be defined as ½.

Meanwhile, at the rising edge shown in (b) of FIG. 9, B component 94 of an input signal 82 is corrected to be decreased by a predetermined value while R component 93 of the input signal 82 is corrected to be increased by a predetermined value, whereby distorted output pixel values can be corrected. The increased R component (R') can be expressed as Equation (4) while the decreased B component (B') can be expressed as Equation (5).

$$R'=\beta \times \{R(p)-R(p-1)\}+R(p-1) \quad (4)$$

$$B'=\alpha \times \{B(p)-B(p-1)\}+B(p-1) \quad (5)$$

Second Embodiment

Figure 10:
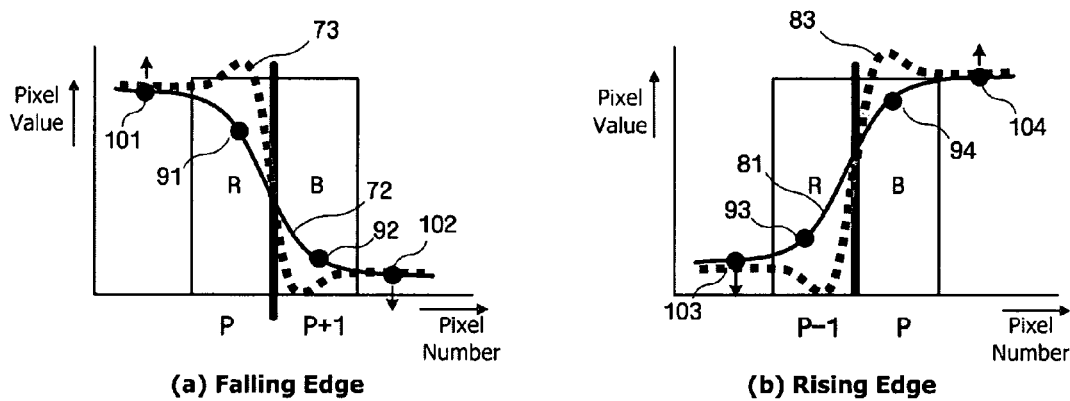
FIG. 10 is a view illustrating a second embodiment of the present invention.

In the second embodiment, a method of changing sub-pixel components adjacent to a distorted sub-pixel component while maintaining the distorted sub-pixel component is suggested as shown in FIG. 10. At the falling edge shown in (a) of FIG. 10, B and G components 101 which are sub-pixels adjacent to R component 91 are corrected to be increased by a predetermined value, whereby the B and G components become a similar level to the increased R component. An increased correction range of the B and G components 101 can have a value equal to a correction range obtained by Equation (2), i.e., $|R'-R(p)|$.

Likewise, G and R components 102 which are sub-pixels adjacent to B component 92 are corrected to be decreased by a predetermined value, whereby the G and R components become a similar level to the decreased B component. An decreased correction range of the G and R components 102 can have a value equal to a correction range obtained by Equation (3), i.e., $|B'-B(p)|$.

Meanwhile, at the rising edge shown in (b) of FIG. 10, B and G components 103 which are sub-pixels adjacent to R component 93 are corrected to be decreased by $|R'-R(p)|$ of Equation (4) while G and R components 104 which are sub-pixels adjacent to B component 94 are corrected to be increased by $|B'-B(p)|$ of Equation (5).

In the second embodiment as above, contrast is more improved than that of the first embodiment.

Third Embodiment

Figure 11:
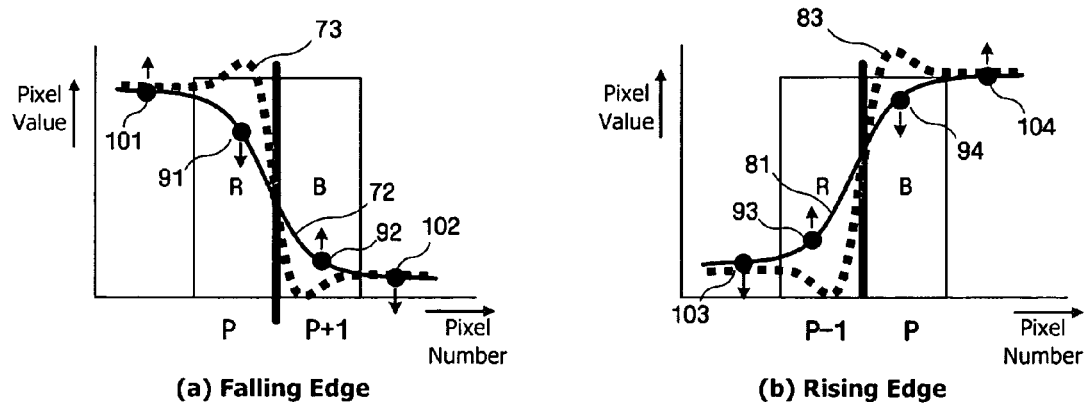
FIG. 11 is a view illustrating a third embodiment of the present invention.

In the third embodiment implemented by combination of the first embodiment and the second embodiment, a method of changing both a distorted sub-pixel component and sub-pixel components adjacent to the distorted sub-pixel component is suggested as shown in FIG. 11.

First, at the falling edge shown in (a) of FIG. 11, R component 91 is corrected to be decreased by a predetermined value and B and G components 101 which are sub-pixels adjacent to the R component 91 are corrected to be increased by a predetermined value, whereby all the components have the same level as one another.

For example, the decreased correction range is equal to the correction range of Equation (2), i.e., a value obtained by multiplying $|R'-R(p)|$ and a predetermined coefficient γ while the increased correction range is equal to a value obtained by multiplying $|R'-R(p)|$ and 1−γ, wherein γ has a constant value between 0 and 1. The third embodiment becomes identical with the first embodiment if γ is equal to 1 while it becomes identical with the second embodiment if γ is equal to 0.

Likewise, the increased correction range of B component 92 is equal to the correction range of Equation (3), i.e., a value obtained by multiplying $|B'-B(p)|$ and a predetermined coefficient γ while the decreased correction range of G and R components 102 is equal to a value obtained by multiplying $|B'-B(p)|$ and 1−γ.

Meanwhile, at the rising edge shown in (b) of FIG. 11, R component 93 is corrected to be increased by the value obtained by multiplying $|R'-R(p)|$ of Equation (4) and γ while B and G components 103 which are sub-pixels adjacent to the R component 93 are corrected to be decreased by the value obtained by multiplying $|R'-R(p)|$ of Equation (4) and 1−γ. Also, B component 94 is corrected to be decreased by the value obtained by multiplying $|B'-B(p)|$ of Equation (5) and γ while G and R components 104 which are sub-pixels adjacent to the B component 94 are corrected to be increased by the value obtained by multiplying $|B'-B(p)|$ of Equation (5) and 1−γ.

Fourth Embodiment

In the fourth embodiment, a dark portion of the distorted sub-pixel according to the second embodiment shown in FIG. 10 is not corrected but a bright portion thereof is corrected.

In other words, at the falling edge, the B and G components 101 which are sub-pixels adjacent to the R component 91 are corrected to be increased by the value $|R'-R(p)|$ of Equation (4). At the rising edge, the G and R components 104 which are sub-pixels adjacent to the B component 94 are corrected to be increased by the value $|B'-B(p)|$ of Equation (5). On the other hand, the sub-pixel 102 adjacent to the B component 92 or the sub-pixel 103 adjacent to the R component 93 is not corrected. This is because that display devices display distortion occurring in the bright portion more efficiently than distortion occurring in the dark portion.

Likewise, the sub-pixel B 92 and the sub-pixel R 93 corresponding to the dark portion of the distorted pixel may not be corrected in the first embodiment shown in FIG. 9.

Figure 12:
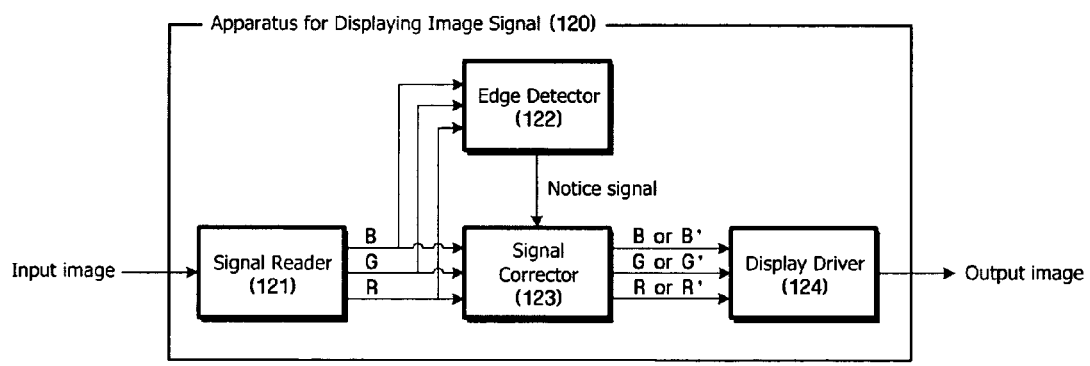
FIG. 12 is a block diagram illustrating an apparatus for displaying an image signal according to an embodiment of the present invention.

The apparatus 120 for displaying an image signal in accordance with the first to fourth embodiments is shown in FIG. 12. The apparatus 120 includes a signal reader 121, an edge detector 122, a signal corrector 123, and a display driver 124.

The signal reader 121 reads sub-pixels, i.e., B, G and R components constituting input images such as still images or moving images. The input images may be generated in such a manner that a video decoder uncompresses the original images. Alternatively, the input images may be the original images which are not compressed. If the input images are of different signal formats such as YCbCr, the signal reader 121 outputs the input images after converting them into RGB signals.

The edge detector 122 receives the RGB signals output from the signal reader 121, determines whether the pixel displayed by the RGB signals belongs to the edge and whether a type of the edge is the rising edge or a falling edge, and notifies the signal corrector 123 of the determined result. The notice signal may be displayed as a first bit showing whether the current pixel belongs to the edge and a second bit showing the type of the edge.

Whether the current pixel belongs to the edge may be determined by various methods. Particularly, whether the current pixel belongs to the edge may be determined by whether the difference between a pixel value of the current pixel and a pixel value of a previous or next pixel exceeds a predetermined threshold value. A value Y (brightness value) of Equation (1) may be used as the pixel value.

Furthermore, the edge detector 122 should determine whether the edge belongs to the rising edge or the falling edge. In other words, the edge detector 122 determines the edge as the falling edge if a resultant value obtained by subtracting the next pixel value from the current pixel value is a positive number while it determines the edge as the rising edge if a resultant value obtained by subtracting the previous pixel value from the current pixel value is a positive number.

Meanwhile, the edge detector 122 may determine the type of the edge using a representative value of the sub-pixel such as Y. However, to detect the edge more exactly, the edge detector 122 may preferably determine whether the difference between the pixel value of the sub-pixel of the current pixel and the pixel value of the sub-pixel of the previous or next pixel exceeds a predetermined threshold value. In this case, since the threshold value may be different depending on each sub-pixel, three threshold values may be required.

Further, the R component is compared with the threshold value at the falling edge while the B component is compared with the threshold value at the rising edge, whereby the edge can be detected.

The signal corrector 123 receives the RGB signals from the signal reader 121 and corrects the RGB signals in accordance with the notice signal received from the edge detector 122 to output or bypass them. The signal corrector 123 bypasses the RGB signals if the first bit of the notice signal shows that the current pixel does not belong to the edge. By contrast, if the first bit of the notice signal shows that the current pixel belongs to the edge, the signal corrector 123 reads the second bit of the notice signal to determine whether the current pixel belongs to the rising edge or the falling edge. As a result, the signal corrector 123 corrects or bypasses each of the RGB signals in accordance with the first to fourth embodiments. A repeated description relating to the method of correcting the signal will be omitted.

The display driver 124 drives a display, such as LCD, PDP and OLED, in accordance with a signal of each sub-pixel input from the signal corrector 123. At this time, the signal of each sub-pixel is controlled to be displayed in the display.

Each component of FIG. 12 may mean software or hardware such as a field-programmable gate array (FPGA) or an application-specific integrated circuit (ASIC). However, each component of FIG. 12 is not limited to software or hardware. In other words, each component of FIG. 12 may be provided in an addressable storage medium or may be provided to implement one or more processors. A function of each component may be implemented by subdivided components, and one component obtained by combination of a plurality of components may be provided to implement a specific function.

FIG. 13 is a flowchart illustrating a method of displaying an image signal according to the embodiment of the present invention.

First, the signal reader 121 reads and outputs sub-pixels, i.e., B, G and R components constituting input images S1.

Then, the edge detector 122 detects a pixel, which belongs to the edge of the input images, from the input images S2.

At this time, the operation S2 includes determining whether the current pixel belongs to the edge and determining a type of the edge if the current pixel belongs to the edge. The operation of determining the type of the edge may be performed before the operation of determining whether the current pixel belongs to the edge.

Whether the current pixel belongs to the edge may be determined based on whether the difference between the brightness value of the current pixel and the brightness value of the previous pixel or the difference between the brightness value of the current pixel and the brightness value of the next pixel exceeds a predetermined value. Alternatively, whether the current pixel belongs to the edge may be determined based on whether the difference between a brightness value of a current sub-pixel and a brightness value of a next or previous sub-pixel exceeds a predetermined value.

Furthermore, the edge can be determined as the falling edge if the resultant value obtained by subtracting the brightness value of the next pixel from the brightness value of the current pixel is a positive number and as the rising edge if the resultant value obtained by subtracting the brightness value of the previous pixel from the brightness value of the current pixel is a positive number.

The signal corrector 123 changes the pixel value of the sub-pixel constituting the pixel belonging to the edge at operation S3.

In the first embodiment, the operation S3 includes decreasing the R component of the sub-pixel if the edge belongs to the falling edge and decreasing the B component of the sub-pixel if the edge belongs to the rising edge.

The operation S3 further includes increasing the B component belonging to the next pixel of the pixel belonging to the edge by the decreased R component if the edge belongs to the falling edge, and decreasing the R component belonging to the previous pixel of the pixel belonging to the edge by the decreased B component. A detailed algorithm relating to the first embodiment is described in Equation (2) to Equation (5).

In the second embodiment, the operation S3 includes increasing the B and G components of the sub-pixel if the edge belongs to the falling edge and increasing the G and R components of the sub-pixel if the edge belongs to the rising edge.

The operation S3 further includes decreasing the G and R components belonging to the next pixel of the pixel belonging to the edge by the increased B and G components if the edge belongs to the falling edge, and decreasing the B and G components belonging to the previous pixel of the pixel belonging to the edge by the increased G and R components if the edge belongs to the rising edge. The detailed description relating to the decreased range will be omitted because it has been already described.

Meanwhile, in the third embodiment, the operation S3 includes decreasing the R component of the sub-pixel and increasing the B and G components of the sub-pixel if the edge belongs to the falling edge, and decreasing the B component of the sub-pixel and increasing the G and R components of the sub-pixel if the edge belongs to the rising edge. The detailed description relating to the decreased or increased range will be omitted because it has already been described.

Finally, the display driver 124 drives the display in accordance with the new pixel value at operation S4. The display may be an LCD, a PDP, or an OLED.

As described above, in the method and apparatus for displaying an image signal according to the present invention, since the color error bands generated by sub-pixel rendering are reduced, it is possible to improve the definition at the edge of the image. In particular, the present invention can be applied to an apparatus for displaying an image signal, such as a PDP, an LCD or an OLED having a striped sub-pixel structure.

The preferred embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method of displaying an image signal in a display apparatus, the display apparatus including a plurality of pixels each having at least two sub-pixels, the method comprising:
   (a) detecting pixels that belong to an edge of an input image;
   (b) changing pixel values of the sub-pixels constituting the pixels belonging to the edge; and
   (c) driving a display in accordance with the new pixel values,
   wherein (b) includes
   (b1) decreasing the right sub-pixel component among the sub-pixels in a single pixel if the edge belongs to the falling edge; and
   (b2) decreasing the left sub-pixel component among the sub-pixels in a single pixel if the edge belongs to the rising edge,
   wherein the decreased right sub-pixel component in (b1) is obtained based on the right sub-pixel component in the current pixel and the right sub-pixel component in the next pixel, and the decreased left sub-pixel component in (b2) is obtained based on the left sub-pixel component in the current pixel and the left sub-pixel component in the previous pixel,
   wherein the right sub-pixel component (R') in (b1) is obtained by an equation $$R'=\alpha \times \{R(p)-R(p+1)\}+R(p+1)$$

wherein R(p) and R(p+1) respectively represent the right sub-pixel component in the current pixel and the right sub-pixel component in the next pixel, and α is a constant between 0 and 1, and
   wherein the edge is where a difference between a pixel value of a pixel and a pixel value of a previous or next pixel exceeds a predetermined threshold value.

2. The method of claim 1, wherein (a) includes:
   (a1) determining whether the current pixel belongs to the edge; and
   (a2) determining whether the edge is a rising edge or a falling edge if the current pixel belongs to the edge.

3. The method of claim 2, wherein (a1) includes determining whether the difference between a brightness value of the current pixel and a brightness value of at least one previous pixel, or the difference between the brightness value of the current pixel and a brightness value of at least one next pixel exceeds a predetermined threshold value.

4. The method of claim 2, wherein (a1) includes determining whether the difference between a brightness value of the current sub-pixel among the sub-pixels constituting the current pixel, and a brightness value of at least one next sub-pixel or at least one previous sub-pixel exceeds a predetermined threshold value.

5. The method of claim 2, wherein (a2) includes:
   determining the current pixel as belonging to a falling edge if a resultant value obtained by subtracting a brightness value of the next pixel from a brightness value of the current pixel is a positive number; and
   determining the current pixel as belonging to a rising edge if a resultant value obtained by subtracting a brightness value of the previous pixel from the brightness value of the current pixel is a positive number.

6. The method of claim 1, wherein (b) includes:
   (b3) increasing the left sub-pixel component in the next pixel of the pixel belonging to the edge by a decreased range in (b1) if the edge belongs to the falling edge; and
   (b4) increasing the right sub-pixel component in the previous pixel of the pixel belonging to the edge by a decreased range in (b2) if the edge belongs to the rising edge.

7. The method of claim 1, wherein the display is one of a liquid crystal display (LCD), a plasma display panel (PDP), a light-emitting diode (LED), and an organic light-emitting diode (OLED).

8. A method of displaying an image signal in a display apparatus, the display apparatus including a plurality of pixels each having at least two sub-pixels, the method comprising:
   (a) detecting pixels that belong to an edge of an input image;
   (b) changing pixel values of the sub-pixels constituting the pixels belonging to the edge; and
   (c) driving a display in accordance with the new pixel values,
   wherein (b) includes
   (b1) decreasing the right sub-pixel component among the sub-pixels in a single pixel if the edge belongs to the falling edge; and
   (b2) decreasing the left sub-pixel component among the sub-pixels in a single pixel if the edge belongs to the rising edge,
   wherein the decreased right sub-pixel component in (b1) is obtained based on the right sub-pixel component in the current pixel and the right sub-pixel component in the next pixel, and the decreased left sub-pixel component in (b2) is obtained based on the left sub-pixel component in the current pixel and the left sub-pixel component in the previous pixel,
   wherein the left sub-pixel component (B') in (b2) is obtained by an equation $$B'=\alpha \times \{B(p)-B(p-1)\}+B(p-1), \text{ and}$$

wherein B(p) and B(p−1) respectively represent the left sub-pixel component in the current pixel and the left sub-pixel component in the previous pixel, and α is a constant value between 0 and 1.

9. A method of displaying an image signal in a display apparatus, the display apparatus including a plurality of pixels each having at least two sub-pixels, the method comprising:
   (a) detecting pixels that belong to an edge of an input image;
   (b) changing pixel values of the sub-pixels constituting the pixels belonging to the edge; and
   (c) driving a display in accordance with the new pixel values,
   wherein (b) includes
   (b1) increasing the left sub-pixel component and the central sub-pixel component among the sub-pixels in a single pixel if the edge belongs to the falling edge; and
   (b2) increasing the central sub-pixel component and the right sub-pixel component among the sub-pixels in a single pixel if the edge belongs to the rising edge,
   wherein the increased left sub-pixel component and the increased central sub-pixel component among the sub-pixels in the single pixel in (b1) are obtained based on the right sub-pixel component in the current pixel and the right sub-pixel component in the next pixel, respectively, and the increased central sub-pixel component and the increased right sub-pixel component among the sub-pixels in the single pixel in (b2) are obtained based on the left sub-pixel component in the current pixel and the left sub-pixel component in the previous pixel, respectively.

10. The method of claim 9, wherein an increased range Δ1 in (b1) is obtained by an equation Δ1=|R(p)−[α×{R(p)−R(p+1)}+R(p+1)]|, wherein R(p) and R(p+1) respectively represent the right sub-pixel component in the current pixel and the right sub-pixel component in the next pixel, and α is a constant between 0 and 1.

11. The method of claim 9, wherein an increased range Δ2 in (b2) is obtained by an equation Δ2=|B(p)−[α×{B(p)−B(p−1)}+B(p−1)]|, wherein B(p) and B(p−1) respectively represent the left sub-pixel component in the current pixel and the left sub-pixel component in the previous pixel, and α is a constant between 0 and 1.

12. The method of claim 9, wherein (b) includes:
(b3) decreasing the central sub-pixel component and the right sub-pixel component in the next pixel of the pixel belonging to the edge by an increased range in (b1) if the edge belongs to the falling edge; and
(b4) decreasing the left sub-pixel component and the central sub-pixel component in the previous pixel of the pixel belonging to the edge by an increased range in (b2) if the edge belongs to the rising edge.

13. An apparatus for displaying an image signal, comprising:
a plurality of pixels each having at least two sub-pixels;
an edge detector detecting pixels that belong to an edge of an input image;
a signal corrector changing pixel values of the sub-pixels constituting the pixels belonging to the edge; and
a display driver driving a display in accordance with the new pixel values,
wherein the signal corrector decreases a right sub-pixel component among the sub-pixels in a single pixel if the edge belongs to the falling edge, and decreases a left sub-pixel component among the sub-pixels in a single pixel if the edge belongs to the rising edge,
wherein the decreased right sub-pixel component is obtained based on the right sub-pixel component in the current pixel and the right sub-pixel component in the next pixel, and the decreased left sub-pixel component is obtained based on the left sub-pixel component in the current pixel and the left sub-pixel component in the previous pixel,
wherein the left sub-pixel component (B') decreased by the signal corrector is obtained by an equation $$B'=\alpha \times \{B(p)-B(p-1)\}+B(p-1),$$

wherein B(p) and B(p−1) respectively represent the left sub-pixel component in the current pixel and the pixel value of the left sub-pixel component in the previous pixel, and α is a constant value between 0 and 1, and
wherein the edge is where a difference between a pixel value of a pixel and a pixel value of a previous or next pixel exceeds a predetermined threshold value.

14. The apparatus of claim 13, wherein the edge detector determines whether the current pixel belongs to the edge, and determines whether the edge is a rising edge or a falling edge if the current pixel belongs to the edge.

15. The apparatus of claim 14, wherein the edge detector determines whether the difference between a brightness value of the current pixel and a brightness value of at least one previous pixel, or the difference between the brightness value of the current pixel and a brightness value of at least one next pixel exceeds a predetermined threshold value.

16. The apparatus of claim 14, wherein the edge detector determines whether the difference between a brightness value of the current sub-pixel among the sub-pixels constituting the current pixel and a brightness value of at least one next sub-pixel or at least one previous sub-pixel exceeds a predetermined threshold value.

17. The apparatus of claim 14, wherein the edge detector determines the current pixel as belonging to a falling edge if a resultant value obtained by subtracting a brightness value of the next pixel from a brightness value of the current pixel is a positive number, and determines the current pixel as belonging to a rising edge if a resultant value obtained by subtracting a brightness value of the previous pixel from a brightness value of the current pixel is a positive number.

18. The apparatus of claim 13, wherein the right sub-pixel component (R') decreased by the signal corrector is obtained by an equation R'=α×{R(p)−R(p+1)}+R(p+1), wherein R(p) and R(p+1) respectively represent the right sub-pixel component in the current pixel and the right sub-pixel component in the next pixel, and α is a constant between 0 and 1.

19. The apparatus of claim 13, wherein the signal corrector increases the left sub-pixel component in the next pixel of the pixel belonging to the edge by a decreased range of the right sub-pixel component, if the edge belongs to the falling edge, and increases the right sub-pixel component in the previous pixel of the pixel belonging to the edge by an increased range of the left sub-pixel component if the edge belongs to the rising edge.

20. An apparatus for displaying an image signal, comprising:
a plurality of pixels each having at least two sub-pixels;
an edge detector detecting pixels that belong to an edge of an input image;
a signal corrector changing pixel values of the sub-pixels constituting the pixels belonging to the edge; and
a display driver driving a display in accordance with the new pixel values,
wherein the signal corrector increases the left sub-pixel component and the central sub-pixel component among the sub-pixels in a single pixel if the edge belongs to the falling edge, and increases the central sub-pixel component and the right sub-pixel component among the sub-pixels in a single pixel if the edge belongs to the rising edge, and
wherein the increased left sub-pixel component and the increased central sub-pixel component among the sub-pixels in the single pixel are obtained based on the right sub-pixel component in the current pixel and the right sub-pixel component in the next pixel, respectively, and the increased central sub-pixel component and the increased right sub-pixel component among the sub-pixels in the single pixel are obtained based on the left sub-pixel component in the current pixel and the left sub-pixel component in the previous pixel, respectively.

21. The apparatus of claim 20, wherein an increased range Δ1 of the B and G components is obtained by an equation Δ1=|R(p)−[α×{R(p)−R(p+1)}+R(p+1)]|, wherein R(p) and R(p+1) respectively represent the right sub-pixel component in the current pixel and the right sub-pixel component in the next pixel, and α is a constant between 0 and 1.

22. The apparatus of claim 20, wherein an increased range Δ2 of the G and R components is obtained by an equation Δ2=|B(p)−[α×{B(p)−B(p−1)}+B(p−1)]|, wherein B(p) and B(p−1) respectively represent the left sub-pixel component in the current pixel and the left sub-pixel component in the previous pixel, and α is a constant between 0 and 1.

* * * * *

UNITED STATES PATENT AND TRADEMARK OFFICE
CERTIFICATE OF CORRECTION

| | | |
|---|---|---|
| PATENT NO. | : 8,063,913 B2 | Page 1 of 1 |
| APPLICATION NO. | : 11/491242 | |
| DATED | : November 22, 2011 | |
| INVENTOR(S) | : Won-hee Choe et al. | |

It is certified that error appears in the above-identified patent and that said Letters Patent is hereby corrected as shown below:

Title Page, Item (75) (Inventors), Delete "Gyeongiu-si" and insert -- Gyeongju-si --, therefor.

Column 1, Line 9, Delete "2006," and insert -- 2005, --, therefor.

Column 9, Line 34, In Claim 1, after "R'=α×{R(p)-R(p+1)}+R(p+1)" insert -- , --.

Signed and Sealed this
Twenty-first Day of February, 2012

David J. Kappos
*Director of the United States Patent and Trademark Office*